United States Patent [19]
Kuo

[11] Patent Number: 5,959,976
[45] Date of Patent: Sep. 28, 1999

[54] METHOD AND DEVICE FOR FILTERING TRANSMISSION

[76] Inventor: Yung-tien Kuo, No. 368, Shih Pi Tan, 3 Lin, Shih-tan Tsun, Chiunglin Hsiang, Hsinchu Hsien, Taiwan

[21] Appl. No.: 08/763,693

[22] Filed: Dec. 9, 1996

[51] Int. Cl.⁶ .................................................. H04L 12/46
[52] U.S. Cl. ........................................... 370/257; 370/402
[58] Field of Search .................................. 370/254–258, 370/401–405

[56] References Cited

U.S. PATENT DOCUMENTS

| | | | |
|---|---|---|---|
| 5,396,493 | 3/1995 | Sugiyama | 370/403 |
| 5,473,607 | 12/1995 | Hausman et al. | 370/403 |
| 5,633,858 | 5/1997 | Chang et al. | 370/255 |
| 5,640,399 | 6/1997 | Rostoker et al. | 370/392 |

*Primary Examiner*—Melvin Marcelo
*Attorney, Agent, or Firm*—Peterson, Wicks, Nemer & Kamrath, PA

[57] ABSTRACT

The present invention relates to a method and device for filtering transmission addresses in Ethernet, more particularly, to a filtering method and device provided to reduce the network loads of different groups in Ethernet. The present invention solves the problems that a large amount of memory space is required and a packet can not be filtered effectively since the the memory contents are lost when power fails in the filtering method of the prior art. The filtering method of the present invention is only to store the flag of the corresponding source address rather than the entire address data. The work for data comparing only reads out the state of the flag of the corresponding address, then refers to the differences between the state of the "0" and "1" of the flag to determine whether the packet should be blocked or allowed to is pass. The memory space will be very small due to only storing the state of the flag. The present invention is further equipped with a programmable timer such that the address data can be just stored into a memory rather than proceeding a comparison and filter in a specific time or every other time interval after power is abruptly disconnected or fails.

19 Claims, 5 Drawing Sheets

METHOD AND DEVICE FOR FILTERING TRANSMISSION

BACKGROUND OF THE INVENTION

1. Field of the Invention

The present invention relates to a method and device for filtering transmission addresses in Ethernet. The design of the invention is primarily to represent whether a source address exists by only a flag with one bit without storing the entire source address data with 48 bits to achieve a memory capacity much smaller and thus much cheaper than the prior art. The invention is further equipped with a programmable timer to make the method and device for filtering transmission addresses in Ethernet more valuable. The programmable timer solves a problem that the packet data can not be filtered normally since the memory contents are lost.

2. Description of the Prior Art

In modern times, the quantity of nodes can be increased under a construction of a "Local Area Network" (LAN) where Ethernet is connected with every computer device, as shown in FIG. 1. In addition to achieving an effect of expansion by connecting stations with each other through a hub inside an individual Ethernet group, a large Local Area Network is formed by connecting Local Area Networks with each other through a bridge, a switch or a router in different Ethernet groups. An advantage of resource-sharing will be gained by serving the bridge, switch or router as a transmission medium in different Ethernet groups. However, with regard to solving a problem that if data transmissions in different Ethernet groups are not limited, they will lead to networks overload and thus slow down the response speed, a device for filtering transmission addresses is generally provided in every Ethernet group. Such a filtering device can store the source address data into a local network to achieve so called a "learning" effect through repeatedly storing the data of different source addresses. When a packet is subsequently sent, if the source address data of the packet based on this learning process and a comparison source address data previously stored are matched, the source address is in the same local Ethernet group. Thus, the packet data can be prevented from flowing into another Ethernet group and the defect that networks overload because the packet data are transmitted improperly can be also prevented.

Herein networks on the right side are defined as B side networks and networks on the left side are defined as A side networks, as shown in FIGS. 2A, 2B. The filtering ways of transmission addresses in the prior art are proceeded in directions of from B side to A side (B2A) and from A side to B side (A2B) with two groups of identical configurations in the upper portion and the lower portion of the drawings respectively. Take the configuration in the lower portion of the drawing for example, as shown in FIG. 2A. The configuration in the lower portion of the drawing is composed of a source address and destination address extractor (SA/DA extractor) 50, two compressors 51, 52, a destination address (DA) comparing controller 53, a source address (SA) learning controller 54, a memory 55 and a filter 56. First, a source address (SA) and a destination address (DA) are extracted from the input packet (I/P) of B2A sent from a B side network through the SA/DA extractor 50. Then, the SA data with 48 bits are compressed to the address data with 12 bits pointed to a memory address by Hash Algorithm through the compressor 52. If the flag of the corresponding memory address is read to be "0" (indication of no data existence) under the control of the SA learning controller 54, the SA data with 48 bits are written into the memory address directly. At the same time, the corresponding flag is changed to "1" (indication of data existence) to complete the steps for learning.

The DA data extracted through the SA/DA extractor 50 are compressed to the address data with 12 bits through another compressor 51 simultaneously. When the flag of the corresponding memory address read from the DA comparing controller is "0", the DA do not exist. The filter in the lowest side of the drawing will be enabled such that the I/P of B2A may transmit to A side networks (i.e., broadcast). There are address data stored into the corresponding memory address if the flag read from the DA comparing controller is "1". If the address data contained in the memory address and a comparison DA data sent in (proceeded in the DA comparing controller 53) are matched, the DA data is in B side networks. Thus, the filter stops the packet from flowing to left side networks (filter) and reversely, the broadcast work is proceeded toward A side networks.

The I/P of A2B coming from an A side network in the upper portion of the drawing, as shown in FIG. 2B, are proceeded to memorize and compare the address data, and control whether the packet data can be allowed to pass or be blocked through the same process described above and will not be explained repetitiously herein.

The following can sum up the method for filtering transmission addresses in Ethernet described above.

(1) Every memory stores the SA data coming from networks on the same side (in the same Ethernet group). Alternatively, every memory only stores the packet data coming from networks on the same side and compares with the DA data coming from networks on the same side, and thus is irrelevant to networks on the other side.

(2) The DA comparing controller compares the entire 48 bits of the address data. If the address data sent to the DA comparing controller compared with the address data stored previously are matched, the packet should be blocked, and reversely, the packet will be allowed to pass.

(3) When two address data collide, they will be not filtered or a second layer memory will be provided for storing the two groups of address data with the same address. The DA data will be compared twice and the filter will not proceed to filter if the data are matched for a more effective filtering effect.

In view of the characteristics for filtering transmission addresses in Ethernet described above, there are some shortcomings which are as follows:

A memory stores the entire address data with 48 bits and has a problem of large memory allocations. Such a problem as taking possession of a memory will become more serious if a second layer memory added provides for storing the address data with the same address as described in the above item (3). Clearly, the efficiency of the memory usage is less than ideal. To achieve the effect of comparing in "real time" and "quickness", the filtering device needs a more complicated and rapid comparing circuit to carry out the mentioned effect when proceeding the data comparing work. Thus, in view of the method for filtering transmission addresses in Ethernet described above, the device for filtering transmission addresses apparently is not ideal and has to be improved.

SUMMARY OF THE INVENTION

The primary objective of the present invention is to provide a method and device for filtering transmission addresses in Ethernet. Mainly, after the source address data are compressed to the address data with 12 bits, the address data are only represented by a state of "0" or "1" of a flag with one bit instead of storing the entire address data. The address data being proceeded for comparison are also the compressed address data written into the corresponding memory address previously. The state of the flag is read out and whether the source address data should be blocked or allowed to pass is determined thereby. Thus, the device for filtering transmission addresses in Ethernet has an advantage of greatly reducing the capacity of a memory required and achieves an effect of lowering the cost without the need of complicated comparing circuit since the memory does not need to memorize the physical address and proceeds the comparing work for the physical address data.

Another objective of the present invention is to provide a method and device for filtering transmission addresses in Ethernet for overcoming a problem that the memory contents will be lost when power fails thus rendering the filtering effect to be in vain. The present invention is further equipped with a programmable timer. The filtering device only proceeds to learn rather than proceeds to filter or block the packet data in a specific time after power has failed or during any other time interval. Therefore, the programmable timer solves a problem that the filtering device can not proceed to filter the packet data normally due to power failure.

The other objective of the present invention is to provide a method and device for filtering transmission addresses in Ethernet. In addition to having the advantages of a small memory space and avoiding the complicated comparing circuit, the differences of the filtering methods between the present invention and the prior art are the following:

(1) The target for learning (memorizing) is the SA data coming from networks on the other side. The filtering method of the present invention is totally different from the filtering method that the SA data for learning only come from networks on the same side in the prior art.
(2) The present invention only compares the learning result rather than comparing the entire address data.
(3) Whether the packet data should be blocked or allowed to pass is determined without comparing the address data when two address data collide.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 2 comprising

DETAILED DESCRIPTION OF THE PREFERRED EMBODIMENT

Figure 1:
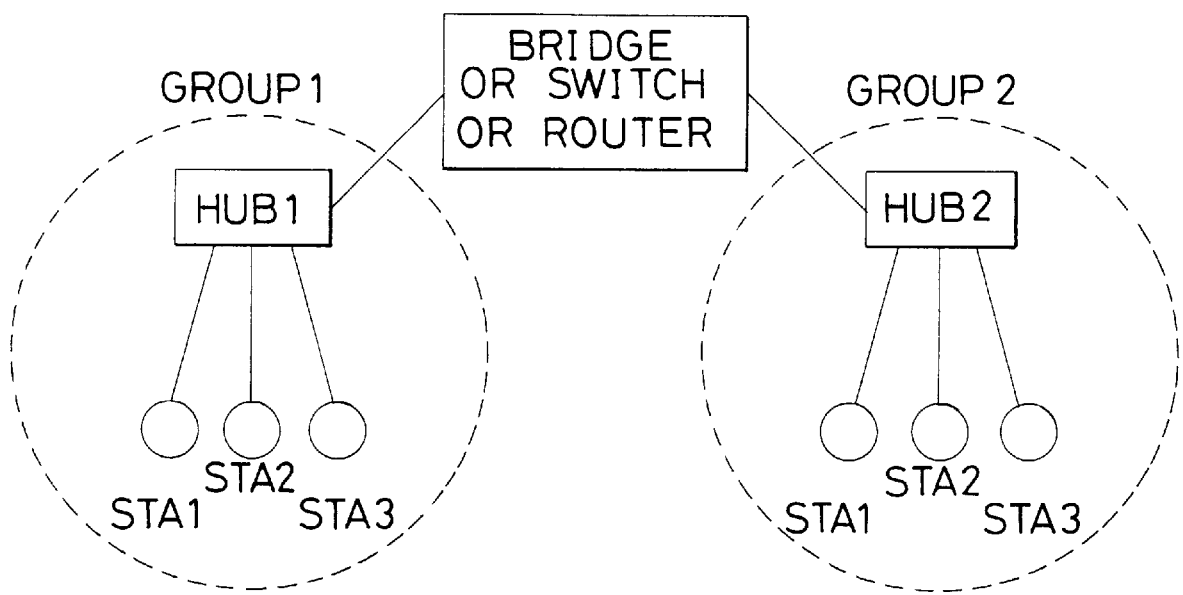
FIG. 1 is a schematic configuration of an Ethernet.
Figure 2A:
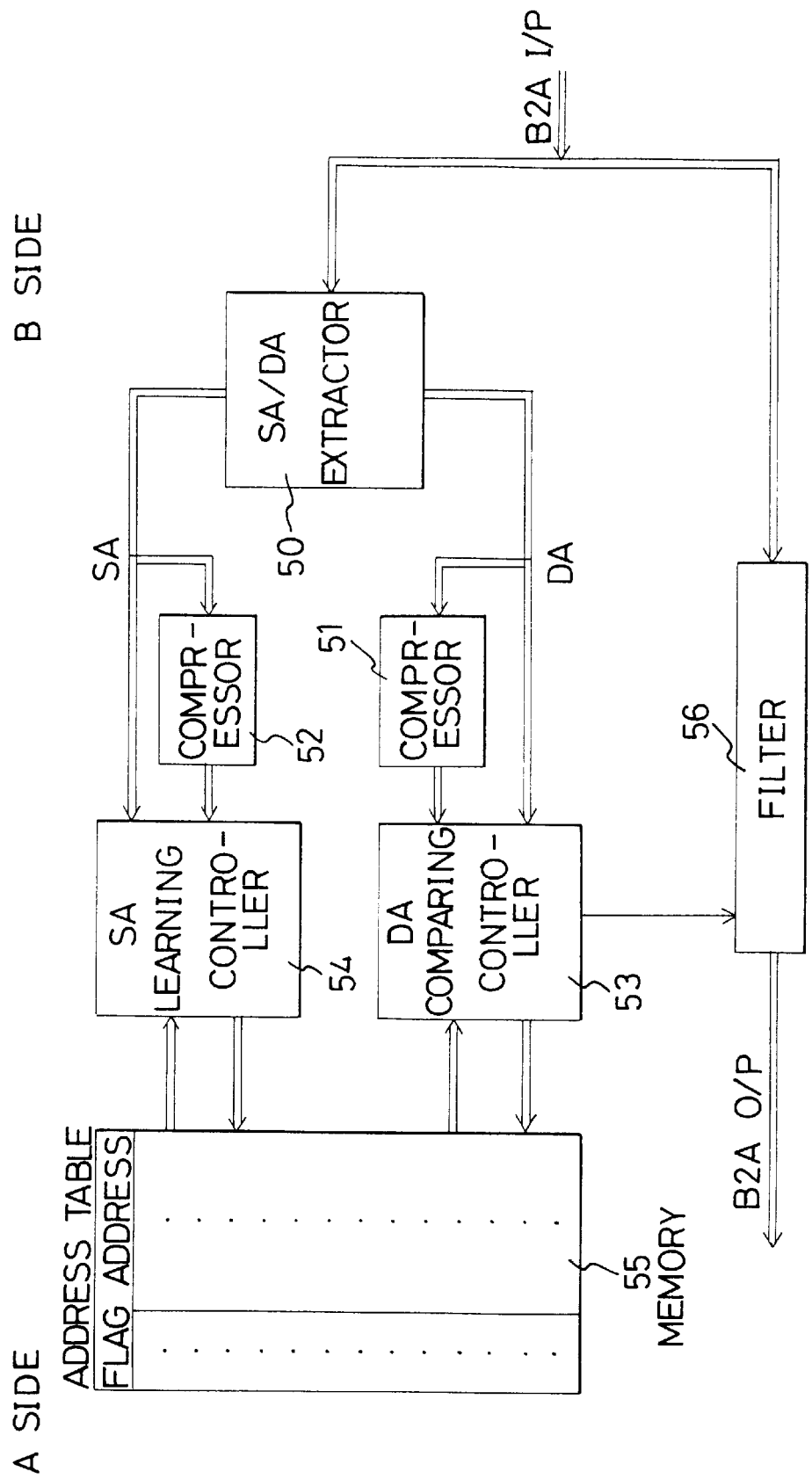
FIGS. 2A and 2B, is a functional block diagram of the device for filtering transmission addresses in Ethernet in the prior art.
Figure 2B:
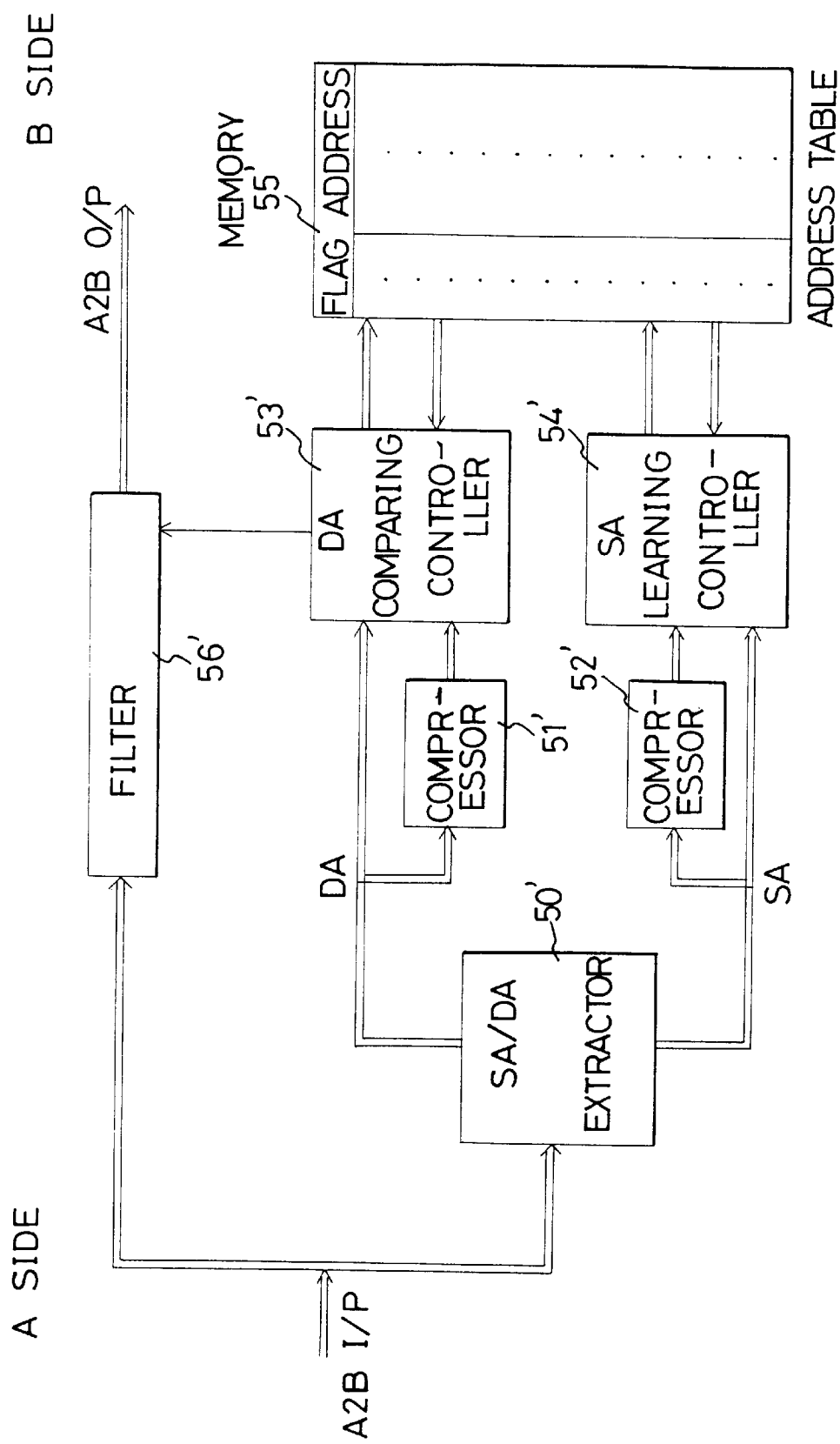
Figure 3:
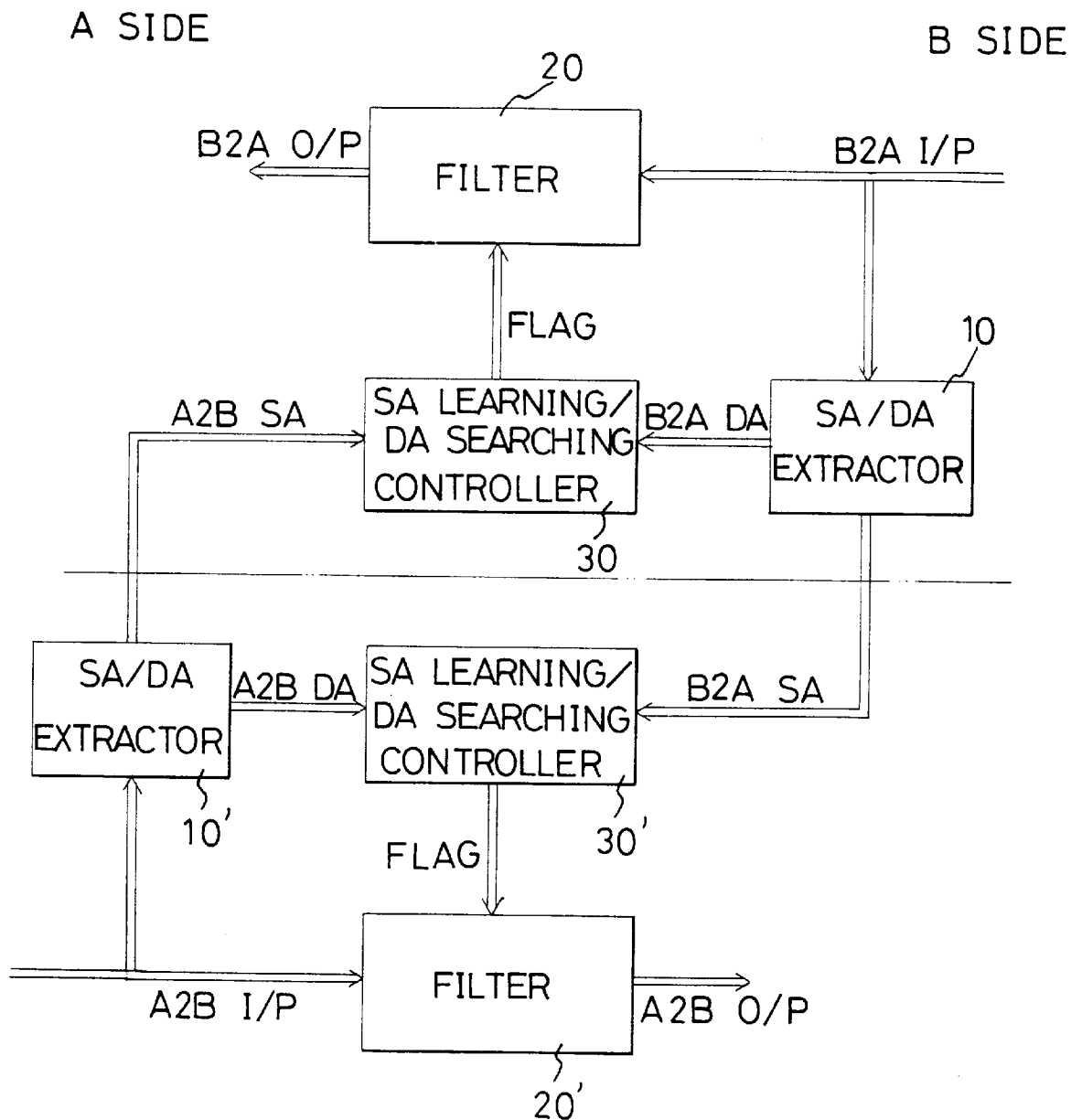
FIG. 3 is a functional block diagram of the device for filtering transmission addresses in Ethernet in the present invention.

As shown in FIG. 3, the design of a method and device for filtering transmission addresses in Ethernet is divided into two groups of identical structures in the upper portion and the lower portion of the drawing to provide connecting networks between B side and A side. The upper portion and the lower portion each is composed of an SA/DA extractor 10, (10') ("extractor" for convenient reference hereinafter), a filter 20, (20'), and an SA learning/DA searching controller 30, (30') ("learning/searching controller" for convenient reference hereinafter). Take the upper portion of the drawing for example, an SA and a DA are extracted from the I/P of B2A sent from a B side network through the extractor 10. The SA data provided for an A side network are sent to the learning/searching controller 30' of the A side networks in the lower portion of the drawing. Similarly, the SA data extracted from the I/P of A2B sent from the A side network in the lower portion of the drawing through extractor 10' are sent to the learning/searching controller 30 of a B side network in the upper portion of the drawing. Alternatively, the SA data generated from the A side network provides the learning/searching controller of the B side networks continuously to learn (store). The DA data extracted from the I/P of B2A coming from the B side network are sent to the learning/searching controller 30 of the B side network. The filtering device searches for the contents of the corresponding memory address in the learning/searching controller 30 in order to determine whether the filter should be enabled to allow the packet data of the B side network to pass to the A side network. Similarly, the DA data extracted from the A side network are the contents read from the corresponding memory address through the learning/searching controller 30' of the A side network to determine whether the packet data of the A side network should be allowed to pass through the filter 20' and be sent to the B side network.

Figure 5:
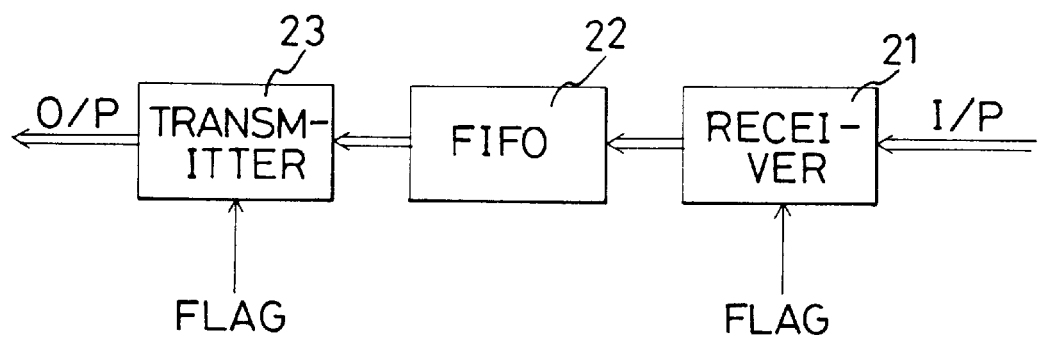
FIG. 5 is an internal block diagram of the filter in the present invention.

Extractors 10, 10' formed by simple counters can extract the SA data and the DA data with 48 bits each from the input packet. Filters 20, 20', as shown in FIG. 5, are composed of a receiver 21, a first-in-first-out (FIFO) buffer 22 and a transmitter 23. Filters can receive, buffer and transmit the packet data coming from the right side networks of the drawing and send out the packet data from the left side of the filter. The receiver 21 and transmitter 23 are controlled by the states of "0" or "1" of the flags sent from the learning/searching controllers 30, 30' shown in FIG. 3 to control the transmitter and receiver to be enabled or disabled. The filter 20 transmits the packet data directly to the output port when the flag shows a "1" or cuts off the path reversely to form a function like an electronic switch.

The fundamental differences between the configuration described above and the filtering device in the prior art are the learning/searching controllers 30, 30'. The inner structures of such learning/searching controllers 30, 30' only need little memory space rather than any data comparing loop at all and thus gain the effect of reducing the cost when compared to the prior art. Furthermore, the way that the SA data and the DA data sent to the learning/searching controllers are also the data sent to controllers from the A side network and the B side network respectively is totally different from the way that the filtering device only learns and searches from networks on the same side in the prior art. Also, the following explains the prevention and cure measures of the present invention in sequence when power has failed.

Figure 4:
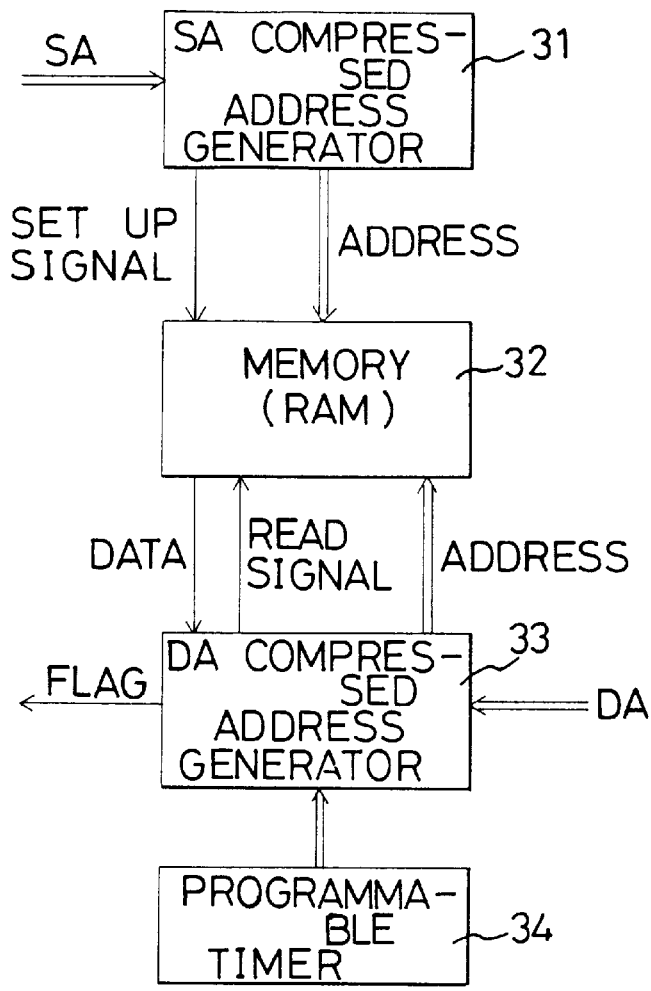
FIG. 4 is an internal block diagram of the learning/searching controller in the present invention.

The inner structures of the learning/searching controllers 30, 30' shown in FIG. 4 can be explained by the learning/searching controller 30 of the B side net work shown in FIG. 3. The inner structure of the learning/searching controller 30 is composed of an SA compressed address generator 31, a DA compressed address generator 33, a memory 32 and a programmable timer 34. The SA compressed address generator 31 provides the connection with the SA data of the A side network. The DA compressed address generator 33 provides the connection with the DA data of the B side network. The memory 32 provides the connection between the two compressed address generators 31, 33. The SA and the DA compressed address generators 31, 33 apply Hash Algorithm being commonly used, such as Cyclic Redundancy Check (CRC) or Exclusive OR (XOR) operation, to compress the SA data and the DA data each with 48 bits to the address data with only 12 bits. For example, the address data with a length of 12 bits can be obtained by using the function $$CRC-12=X^{12}+X^{11}+X^3+X^2+1$$

or by using the XOR operation twice.

$$XOR1[23:0]=SA[48:24]+SA[23:0]$$

$$XOR2[11:0]=XOR1[23:12]+XOR1[11:0].$$

Such compressive operations are the same as the compressive operations in the prior art and will not be explained repetitiously herein.

Both of the SA data and the DA data become the address data of the memory 32 after the SA data and the DA data are compressed to the address data with 12 bits by the SA and the DA compressed address generators 31, 33 and point to the region of the corresponding memory addresses. The SA compressed address generator 31 further sends out a setup signal for providing a writing signal that the memory needs and the DA compressed address generator 33 sends out a read signal for reading out the memory contents. The address data sent from memory 32 are the address data resent to the DA compressed address generator 33 and which then become an output flag. The output flag directly controls the filter 30 shown in FIG. 3 to be enabled or disabled according to the state of "0" and "1" of the flag. The DA compressed address generator does not need any data comparing work in the stage of reading out the address data and the address data can be sent out directly.

The memory 32 corresponds to the address data with 12 bits sent from both of the DA and the SA compressed address generators 31, 33 described above and thus, the memory needs a space with only a capacity of the twelfth power of 2. Each memory address is represented only by a flag of "0" and "1" with one bit to record whether the corresponding SA data have been sent or not (in the embodiment, "0" represents there are no data existing, "1" represents there are data existing). After the SA address data are sent from the A side network, "1" is written into the memory address directly through a setup signal when the SA address data are compressed to the address data with 12 bits by the compressive operation and points to the corresponding memory address. After the DA address data sent from the B side network are similarly compressed to the address data with 12 bits through the compressive operation, the state of the flag of the corresponding address in memory 32 is read out. The DA data are in the A side network if the state of the flag of the corresponding memory address is "1" such that the packet data sent from the B side network are sent to the A side network through the filter 20. The DA data are not in the A side network if the state of the flag is "0", so the filter 20 will be disabled in order not to send the packet data to the A side network and thus, the load of the network will be reduced. When the DA data belong to the data of the type of "Multicast or Broadcast", the filter is not restricted to the state of the flag described above. The filter is in the state of leading directly providing for data transmission. In addition, the filter is directly considered to be in a broadcast mode under the situation that there exist two groups of address data with the same memory address (data collision) and the filter is also in the state of leading directly without proceeding to filter the packet data.

As described above, the conditions of the filters 20, 20' for filtering are determined completely referring to the memory contents of the learning/searching controllers 30, 30'. To prevent the communication between the two networks from being disrupted whereby the contents will be lost due to unstable power consumption, the programmable timer 34 shown in FIG. 4 is employed, as was previously referred to, in avoidance of such a problem. The programmable timer basically has two kinds of implementation type as follows:

(1) In the time between power has failed and then is restored, the work for counting time in a specific time is proceeded through a programmable timer 34. The filters 20, 20' are forced not to proceed data filtering, but only to proceed data storage (learning) in the memory 32 in this period of time. The filters recover to their normal operation states after this time interval and the problem that there are no connections between two networks can be avoided in this manner.

(2) The mode that the packet data are set not to filter in some small time interval of every day or every hour can eliminate the trouble of losing memory contents and thus, networks can not connect with each other.

Since the contents of the memory address are only represented by a flag with one bit in the method and the configuration described above, the memory only needs a space of memory capacity of the twelfth power of 2 (4K bits) in the circumstances of the address data with 12 bits. In the conventional configuration, for storing the source address data with the entire 48 bits, though the memory address is the same size as the twelfth power of 2, for the reason of storing 48 bits, traditional memory is about 48 times the size of the present invention. The present invention has the advantage of compact memory space as well as the effect of cost reduction thereof.

In the respect of data comparing, the present invention further shows the state for filtering or allowing to pass by the states of "0" or "1" of the contents in the memory with one bit directly. The invention only needs to send out the contents of the memory address directly without the need of any circuit for data comparing at all. The present invention especially has the advantages of simplified structure and low cost when compared with the conventional complicated comparing circuit that has to proceed to compare the address data with 48 bits.

In addition, the present invention described above is further equipped with a programmable timer to solve the problem that the memory contents will be lost and result in disconnection between two networks. The present invention becomes a design more progressive and utilizable than the conventional method for filtering transmission addresses in Ethernet.

In conclusion, the differences in the filtering method between the present invention and the prior art can be summed up as follows:

(1) The target for learning is the SA coming from the network on the other side.

(2) The result (flag) of learning determines whether the packet data received should be blocked or allowed to pass.

(3) The result of learning (the state of the flag) will be sent out directly when the packet data are received. The packet data should be allowed to pass if matched, otherwise, they will be blocked by the filter.

(4) When two address data collide, the filter will be set to a broadcast mode and does not need any comparing step.

(5) The memory space will be greatly saved by only storing a flag with one bit rather than the entire address data.

(6) The filtering device will have the advantage of a simplified structure since the filtering device does not need to compare the address data and can even eliminate the complicated circuit for comparing the address data.

Although the invention has been explained in relation to its preferred embodiment, it is to be understood that many other possible modifications and variations can be made without departing from the spirit and scope of the invention as hereinafter claimed.

I claim:

1. A method for filtering transmission addresses in Ethernet for determining whether a packet is allowed to pass or is blocked between two network groups, comprising:

a step for extracting source address data and destination address data from said packet formed in every network group through an extractor;

a step for compressing said source address data and said destination address data extracted from every network group to source address data and destination address data with a small quantity of bits, namely, compressed source address data and compressed destination address data respectively;

a step for setting compressed source address data corresponding to said source address data with a small quantity of bits to be a setup signal for writing said compressed source address data into a memory address and setting a corresponding memory address to be an effective flag;

a step for setting compressed destination address data corresponding to said destination address data with a small quantity of bits to be a read signal for reading out said compressed destination address data from a memory address and reading out a state of said effective flag; and a step for determining whether said packet is allowed to pass or is blocked according to said state of said effective flag.

2. The method for filtering transmission addresses in Ethernet as claimed in claim 1, wherein said effective flag is represented by one bit.

3. The method for filtering transmission addresses in Ethernet as claimed in claim 1, wherein said extractor is formed by a counter.

4. The method for filtering transmission addresses in Ethernet as claimed in claim 1, wherein said source address data extracted from one of said two network groups becomes a basis of said destination address data of the other one of said two network groups to be searched for.

5. The method for filtering transmission addresses in Ethernet as claimed in claim 1, wherein said compressed source address data and said compressed destination address data are implemented with an operation method of Cyclic Redundancy Check.

6. The method for filtering transmission addresses in Ethernet as claimed in claim 1, wherein said compressed source address data and said compressed destination address data are implemented with an operation method of Exclusive OR.

7. The method for filtering transmission addresses in Ethernet as claimed in claim 1, wherein said compressed source address data and said compressed destination address data each have a length of 12 bits.

8. The method for filtering transmission addresses in Ethernet as claimed in claim 1, further comprising a broadcast mode set to be not controlled by said effective flag in a specific time interval, and only for learning rather than for filtering, to reduce the effect of losing memory contents.

9. The method for filtering transmission addresses in Ethernet as claimed in claim 1, further comprising a mode set to be not controlled by said effective flag and proceeding to allow said packet to pass directly instead of filtering said packet during a certain time interval after power has failed.

10. The method for filtering transmission addresses in Ethernet as claimed in claim 1, further comprising a step proceeding to broadcast rather than proceeding to filter said packet when two address data collide.

11. A device for filtering transmission addresses is in Ethernet for determining whether a packet is allowed to pass or is blocked between two network groups, comprising:

extractors extracting source address data and destination address data from said packet formed in every network group;

compressed address generators compressing said source address data and said destination address data extracted from every network group to address data with a small quantity of bits;

memories having the provision of sending said address data with a small quantity of bits described above and representing said address data corresponding to a memory address by a flag, and proceeding to set said flag or reading out the state of said flag by said memory address corresponding to source address data or destination address data respectively; and filters being in between two different networks and determining their operations of being enabled or disabled according to said state of said flag.

12. The device for filtering transmission addresses in Ethernet as claimed in claim 11, wherein said flag is represented by one bit.

13. The device for filtering transmission addresses in Ethernet as claimed in claim 11, wherein said extractors are formed by counters.

14. The device for filtering transmission addresses in Ethernet as claimed in claim 11, wherein said source address data extracted from one of said two network groups become an input of said compressed address generators of the other one of said two network groups to proceed the comparison between said source address data and said destination address data of said two network groups.

15. The device for filtering transmission addresses in Ethernet as claimed in claim 11, wherein said compressed source address data and said compressed destination address data are implemented with an operation tool of Cyclic Redundancy Check.

16. The device for filtering transmission addresses in Ethernet as claimed in claim 11, wherein said compressed source address data and said compressed destination address data are implemented with an operation tool of Exclusive OR.

17. The device for filtering transmission addresses in Ethernet as claimed in claim 11, wherein said compressed source address data and said compressed destination address data each have a length of 12 bits.

18. The device for filtering transmission addresses in Ethernet as claimed in claim 11, further comprising a programmable timer proceeding to learn and to filter said packet through a filter in a broadcast mode set to be not controlled by said flag in a specific time interval.

19. The device for filtering transmission addresses in Ethernet as claimed in claim 11, further comprising a programmable timer set to be not controlled by said flag and said filter proceeds not to block said packet but to allow said packet to pass directly during a certain time interval after power has failed.

* * * * *

UNITED STATES PATENT AND TRADEMARK OFFICE
CERTIFICATE OF CORRECTION

PATENT NO.   : 5,959,976
DATED        : September 28, 1999
INVENTOR(S)  : Yung-tien Kuo It is certified that error appears in the above-identified patent and that said Letters Patent is hereby corrected as shown below:

<u>Title page,</u>
After item [76], please add -- Assignee: Winbond Electronics Corp., Hsinchu, Taiwan R.O.C. --

Signed and Sealed this

Tenth Day of December, 2002

JAMES E. ROGAN
*Director of the United States Patent and Trademark Office*